(12) United States Patent
Ruan et al.

(10) Patent No.: US 9,584,000 B2
(45) Date of Patent: Feb. 28, 2017

(54) METHOD AND DEVICE FOR TORQUE GENERATION BASED ON ELECTROMAGNETIC EFFECT

(71) Applicant: Beijing University of Technology, Beijing (CN)

(72) Inventors: Xiaogang Ruan, Beijing (CN); Xiaoqing Zhu, Beijing (CN); Rongyi Sun, Beijing (CN); Ruoyan Wei, Beijing (CN); Naigong Yu, Beijing (CN); Daoxiong Gong, Beijing (CN); Guoyu Zuo, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 14/846,726

(22) Filed: Sep. 4, 2015

(65) Prior Publication Data

US 2016/0006329 A1  Jan. 7, 2016

Related U.S. Application Data

(63) Continuation-in-part of application No. 13/689,731, filed on Nov. 29, 2012, now Pat. No. 9,148,046.

(51) Int. Cl.
  *H02K 26/00* (2006.01)
  *H02P 21/00* (2016.01)

(52) U.S. Cl.
  CPC ............. *H02K 26/00* (2013.01); *H02P 21/001* (2013.01); *H02P 21/0003* (2013.01)

(58) Field of Classification Search
  CPC ..... H02K 26/00; H02P 21/001; H02P 21/0003
  USPC ....... 310/36, 89, 328, 78, 74, 75 R, 80, 100, 310/102 R, 102 A, 103, 104, 115
  See application file for complete search history.

(56) References Cited

U.S. PATENT DOCUMENTS

| | | | | |
|---|---|---|---|---|
| 3,772,540 A | * | 11/1973 | Benson | H02K 41/065 310/14 |
| 5,336,956 A | * | 8/1994 | Haner | H02K 3/28 310/179 |
| 2006/0108886 A1 | * | 5/2006 | Kehr | H02K 23/58 310/103 |
| 2010/0213885 A1 | * | 8/2010 | Ichiyama | H02K 1/276 318/720 |

* cited by examiner

*Primary Examiner* — Naishadh Desai
(74) *Attorney, Agent, or Firm* — Han IP Corporation

(57) ABSTRACT

A method and device of torque generation based on electromagnetic effect is provided. An electromagnetic torque whose direction is opposite to the motor driving direction is generated in a magnetic field when a motor-drive armature winding is adopted based on the electro-magnetic induction principle. Meanwhile, a reverse electromagnetic torque which is reverse to the armature winding with the same magnitude, is applied on a magnet set and is transmitted to an underactuated system so as to provide required torque for the underactuated system. Advantageously, the provided torque is in direct ratio to speed, difficulty in control is significantly reduced, two-stage electromagnetic variable speed can be achieved, the design of the system is simple and reliable with a concise and clear structure, and the device may be employed in a wide variety of applications.

16 Claims, 12 Drawing Sheets

METHOD AND DEVICE FOR TORQUE GENERATION BASED ON ELECTROMAGNETIC EFFECT

CROSS-REFERENCE TO RELATED APPLICATION

This is a continuation-in-part (CIP) application of U.S. patent application Ser. No. 13/689,731, filed on Nov. 29, 2012, which claims the priority benefit of Chinese Patent Application No. 201210272457.9, Chinese Patent Application No. 201210272797.1 and Chinese Patent Application No. 201210272444.1, all of which were filed on Aug. 1, 2012. The above-identified applications are hereby incorporated by reference in their entirety.

TECHNICAL FIELD

The present invention relates to torque generation and, more particularly, to a method and device of torque generation based on electromagnetic effect.

BACKGROUND

Due to the lack of a direct acting force or a torque, system control of an underactuated system generally tends to be difficult. For example, a unicycle robot may have only one wheel contacting the ground and an ordinary wheel is only capable of forward and backward movement, so the unicycle robot cannot provide a lateral torque while the veer of the unicycle robot needs a torque. Likewise, a satellite, a spacecraft and a missile all need to be driven by a torque in order to point to a predetermined direction. An advanced spacecraft and a missile generally realize attitude adjustment through outward gas ejection, and the satellite may use inertial flywheel rotation for generating a reaction wheel and a magnetic torque or a liquid loop so as to realize attitude adjustment. The main propeller reverse torque overcoming of a helicopter or a saucer aircraft is realized by adopting a rotating tail propeller that is orthogonal to a main propeller.

Certain existing approaches utilize a scheme of controlling lateral balance of a unicycle robot by an inertial flywheel. One other approach utilizes a scheme of controlling lateral veer of a unicycle robot by an inertia flywheel. The method of using an inertia flywheel to provide a reverse torque is also widely employed in satellite attitude adjustment, although it is difficult to use an inertia flywheel providing reverse torque to control attitude. The reason is that the magnitude of the reverse torque provided by an inertia flywheel is in direct ratio to rotational acceleration of the flywheel while a motor is a speed servo system for which tracking for acceleration is not easy to achieve when the flywheel rotates at a uniform speed, and thus no reverse torque is generated. In addition, the magnitude of the provided reverse torque is limited because of the limitation of the rotational speed of the motor.

One technique, as disclosed in Chinese Patent Application No. 200510111490.3, provides a method and system for controlling attitude of micro-satellite based on an active magnetic control, mainly by adopting magnetic torque active magnetic control, integrating with gravity gradient rod and momentum wheel offset stabilization control unit to form satellite attitude stabilization platform, and utilizing coil current interaction on the geomagnetic field and a satellite to provide a torque to adjust satellite attitude. Such technique is significantly different from that of the present invention in that the interaction between a permanent magnet and an armature winding in the magnetic field are utilized to generate a counter torque. On the other hand, according to the technique as disclosed in Chinese Patent Application No. 200910152010.6, an angular momentum produced through liquid flowing in a pipe enables the satellite attitude to change. However, such technique is also significantly different from that of the present invention in a scheme that electromagnetic effect is used to adjust satellite attitude. For a spacecraft, the carried gas capable of being jetted out is limited, while the scheme where electrical energy is converted into mechanical energy can utilize inexhaustible solar energy.

A technique, as disclosed in Chinese Patent Application Nos. 200720037988.4 and 200820120359.2, uses everyday objects to complete many experiments of motor-driven electromagnet generation principle, eddy current working principle, eddy current generation effect and eddy current generating torque under magnetic field effect. Another technique, as disclosed in Chinese Patent Application No. CN102529574A, provides a mobile medical equipment truckle with an electromagnetic torque balance motor installed, wherein the technique can use friction torque of electromagnetic torque balance truckle generated by the rotation of the truckle, to reduce thrust for the working staff. Yet another technique, as disclosed in Chinese Patent Application No. CN1532656A, provides a miniature three-shaft attitude control device, including three planar motors, a cube support frame and a control plate, wherein the planar motors include rotors, stators, rotor shafts and bearings. The rotors comprise a plurality of pairs of magnetic poles. The planar motors are disposed on three mutually perpendicular planes of the cube support frame through the rotor shafts and the bearings. Because stator coils in the stators are secured on a substrate, and a flat stator is in a fixed state, the direction of reactive force applied on the rotors is opposite to direction of the force applied on the stators. The stator coils are continuously made to pass through three-phase square wave current according to a certain electrifying sequence, that is, continuous rotation of the rotors is guaranteed. Such a structure ensures larger rotating torques of the motors. Still another technique, as disclosed in Chinese Patent Application No. CN1983098A, provides a micro satellite attitude control system containing a magnetorquer, wherein the magnetorquer is formed by three magnetic bars and its power amplifier circuit. When current passes through the magnetic bars, controllable magnetic torque, which can react with the ground magnetic field to generate three-shaft control torque, can be generated. A control system with active magnetic control by the magnetorquer as the core and in combination with gravity gradient rod and momentum wheel offset stabilization works as a satellite attitude stabilization platform.

SUMMARY

The above-identified techniques are all based on electromagnetic induction principle originating from Maxwell equation. However, the above-identified techniques are significantly different from the present invention in technical field, technical scheme and effect. For example, the above-identified techniques do not disclose a magnet set, an armature winding, and a motor being coaxially connected with shaft-used arch keys of the armature winding with the arch keys located in the front end cap. In other words, in the above-identified techniques, the electromagnetic effect is not used to generate a torque, let alone using such a torque to drive an underactuated system. Furthermore, the technical implication that a torque generated by electromagnetic effect between a magnetic field and a winding connected with power is used to control and adjust an underactuated system is not mentioned in the above-identified techniques. Besides, adjusting the attitude of an underactuated system including a unicycle robot, a spacecraft, a satellite and the like by using the torque generated by electromagnetic effect is endowed with the technical effects of simple control, no mechanical loss and nonexistence of noise.

The present invention relates to a method and device of torque generation based on electromagnetic effect, which can provide a torque required for an underactuated system, being widely used in the fields such as unicycle robot lateral attitude adjustment, unicycle robot veer, satellite attitude adjustment, spacecraft attitude adjustment, missile attitude adjustment, main propeller reverse torque overcoming of a helicopter or a saucer aircraft, etc.

In order to provide a required torque in direct ratio to speed for an underactuated system and make it convenient for control by a motor, the present invention provides a method and device of torque generation based on electromagnetic effect, for applications in the fields such as unicycle robots, satellites, spacecraft and missile attitude adjustment, main propeller reverse torque overcoming of a helicopter or a saucer aircraft.

According to one aspect, a method of torque generation based on electromagnetic effect is characterized in that: electromagnetic torque generated by electromagnetic effect between a magnetic field as a shell of a driving body, and a rotating armature winding, is used to adjust attitude of an underactuated system including a unicycle robot, a spacecraft and a satellite, wherein the shell is a magnetic cylinder in a cylindrical shape, and the mentioned rotating armature winding is coaxially arranged in the magnetic cylinder. The air gap exists between the shell and the rotating armature winding, and they are in contrarotation relative to each other under the role of electromagnetic torque.

A first embodiment of a torque generation device based on electromagnetic effect according to the method of torque generation based on electromagnetic effect may include: a shell, a magnet set, an armature winding, a front bearing, a rear bearing, a front end cap, a rear end cap, a motor, a motor bracket, and a load.

The shell may be a magnetic cylinder, the lower part thereof being connected with a rectangular parallelepiped that is fixedly connected with an underactuated system disposed outside the torque generation device. The underactuated system may include at least a to-be-activated system such as a unicycle robot, a helicopter, a saucer aircraft, a satellite, a spacecraft or a missile. The shell may further contain a magnet set, composed of a plurality of (e.g., four or more) blocks of permanent magnets which are symmetrically fixed and distributed on the inner side of the shell, and are in fixed connection so as to form an approximately constant magnetic field.

The armature winding may be coaxially inserted in the shell, and each of the armature winding and the shell may rotate in the same direction relative to each other. Air gap may exist between the magnet set and the armature winding that is in parallel connection with the load.

The front bearing may be coaxially connected with the armature winding and may be embedded in a bearing groove in the center of the front end cap buckled on the front end part of the shell.

The rear bearing may be coaxially connected with the armature winding and may be embedded in a bearing groove in the center of the rear end cap. The rear end cap may be buckled in the rear end part of the shell.

The motor may be in a coaxial rotary joint with the shaft of the armature winding by the arch key, with the armature winding protruding from the front end cap.

The motor bracket may be formed by a ring located in the upper part of the motor bracket and a rectangular strip located at the lower part of the motor bracket. The ring located in the upper part of the motor bracket and the motor may be coaxially inserted and fixed. The rectangular strip located at the lower part of the motor bracket may be in fixed connection with a stationary part of the underactuated system.

A second embodiment of a torque generation device based on electromagnetic effect according to the method of torque generation based on electromagnetic effect may include: a shell, a magnet set, an armature winding, a rear bearing, a rear end cap, a motor, and a load.

The shell may be a magnetic cylinder, the lower part thereof being connected with a rectangular parallelepiped that is fixedly connected with an underactuated system disposed outside the torque generation device. The underactuated system may include at least a to-be-activated system such as a unicycle robot, a helicopter, a saucer aircraft, a satellite, a spacecraft or a missile. The shell may further contain a magnet set, composed of a plurality of (e.g., four or more) blocks of permanent magnets which may be symmetrically fixed and distributed on the inner side of the shell, and may be in fixed connection so as to form an approximately constant magnetic field.

The armature winding may be coaxially inserted in the shell, and each of the armature winding and the shell may rotate in the same direction relative to each other. Air gap may exist between the magnet set and the armature winding that is in parallel connection with the load.

The rear bearing may be coaxially connected with the armature winding and may be embedded in a bearing groove in the center of the rear end cap. The rear end cap may be buckled in the rear end part of the shell.

The motor may be embedded in the front end part of the shell, and the shaft of the motor may be in a coaxial rotary joint with the armature winding by the arch key.

A third embodiment of a torque generation device based on electromagnetic effect according to the method of torque generation based on electromagnetic effect may include: a shell, a magnet set, an armature winding, a front end cap, a motor, a motor seat, and a load.

The shell may be a magnetic cylinder formed integrated connection of a cylinder with one end being open and a shaft of a variable cross-section at the external side of a bottom of the cylinder. The internal bottom of the cylinder may be provided with a bearing groove. The shaft of the variable section may be in a coaxial fixed joint with a certain underactuated system disposed outside the torque generator. The underactuated system may include at least a to-be-activated system such as a unicycle robot, a helicopter, a saucer aircraft, a satellite, a spacecraft or a missile. The shell may further contain a magnet set that is composed of a plurality of (e.g., four or more) blocks. The permanent magnets may be symmetrically fixed and distributed on the inner side of the shell, and may be in fixed connection so as to form an approximately constant magnetic field.

The armature winding may be coaxially inserted in the shell, and each of the armature winding and the shell may rotate in the same direction relative to each other. Air gap may exist between the magnet set and the armature winding that is in parallel connection with the load.

The center of the front end cap may be provided with a bearing groove so as to arrange a bearing which is in a coaxial rotary joint with the front end of the armature winding, and the front end cap may be buckled in the front end part of the shell.

The motor may be fixed on a motor seat that is in fixed connection with the underactuated system. The shaft of the motor may be in fixed connection with the armature winding by the arch key, with the armature winding protruding from the front end cap.

A fourth embodiment of a torque generation device based on electromagnetic effect according to the method of torque generation based on electromagnetic effect may include: a shell, a magnet set, an armature winding, a front end cap, a rear end cap, a motor, a motor seat, and a load.

The shell may be a magnetic cylinder, the entire periphery of which may be in integrated connection with an electro-mechanical transmission component, which may comprise any of a gear, a cam or an impeller, may be cooperatively connected with a certain underactuated system positioned outside the torque generator. The underactuated system may comprise at least a to-be-activated system such as a unicycle robot, a helicopter, a saucer aircraft, a satellite, a spacecraft or a missile. The shell may further contain a magnet set, composed of a plurality of (e.g., four or more) blocks of permanent magnets which may be symmetrically fixed and distributed on the inner side of the shell, and may be in fixed connection so as to form an approximately constant magnetic field.

The armature winding may be coaxially inserted in the shell, and each of the armature winding and the shell may rotate in the same direction relative to each other. Air gap may exist between the magnet set and the armature winding that is in parallel connection with the load.

The center of the front end cap may be provided with a bearing groove so as to arrange a bearing which is in a coaxial rotary joint with the front end of the armature winding, and the front end cap may be buckled in the front end part of the shell.

The center of the rear end cap may be provided with a bearing groove so as to arrange a bearing which is in a coaxial rotary joint with the rear end of the armature winding in a rotating manner, and the rear end cap may be buckled in the front end part of the shell.

The motor may be fixed on a motor seat that is in fixed connection with the underactuated system. The shaft of the motor may be in fixed connection with the armature winding by the arch key, with the armature winding protruding from the front end cap.

A torque generation device based on electromagnetic effect may be further characterized in that the periphery of the shell may be coated with a layer of electromagnetic shielding material.

A torque generation device based on electromagnetic effect may be further characterized in that permanent magnets of the magnets set may be replaced by an exciting winding which coaxially winds around a main pole core to form a magnetic field.

The device and method provided in the present invention provides numerous advantageous. Firstly, the rotating speed of the motor is controlled to generate an electromagnetic reverse torque which is in direct ratio to the speed of the motor, and the torque is applied in an underactuated system; therefore, the underactuated system is simply converted into a fully actuated system and difficulty in control is greatly reduced. Secondly, with an electromagnetic transmission device, which is capable of realizing two-stage electromagnetic speed varying, is adopted in the present invention, variable speed and the like can be realized by changing the electromagnetic torque which is in direct ratio to the speed in the case of the existence of constant shell diameter. Additionally, advantages such as non-existence of dead zone, mechanical loss and noise etc. can be realized through the engagement of gears in different sizes.

Figure 1:
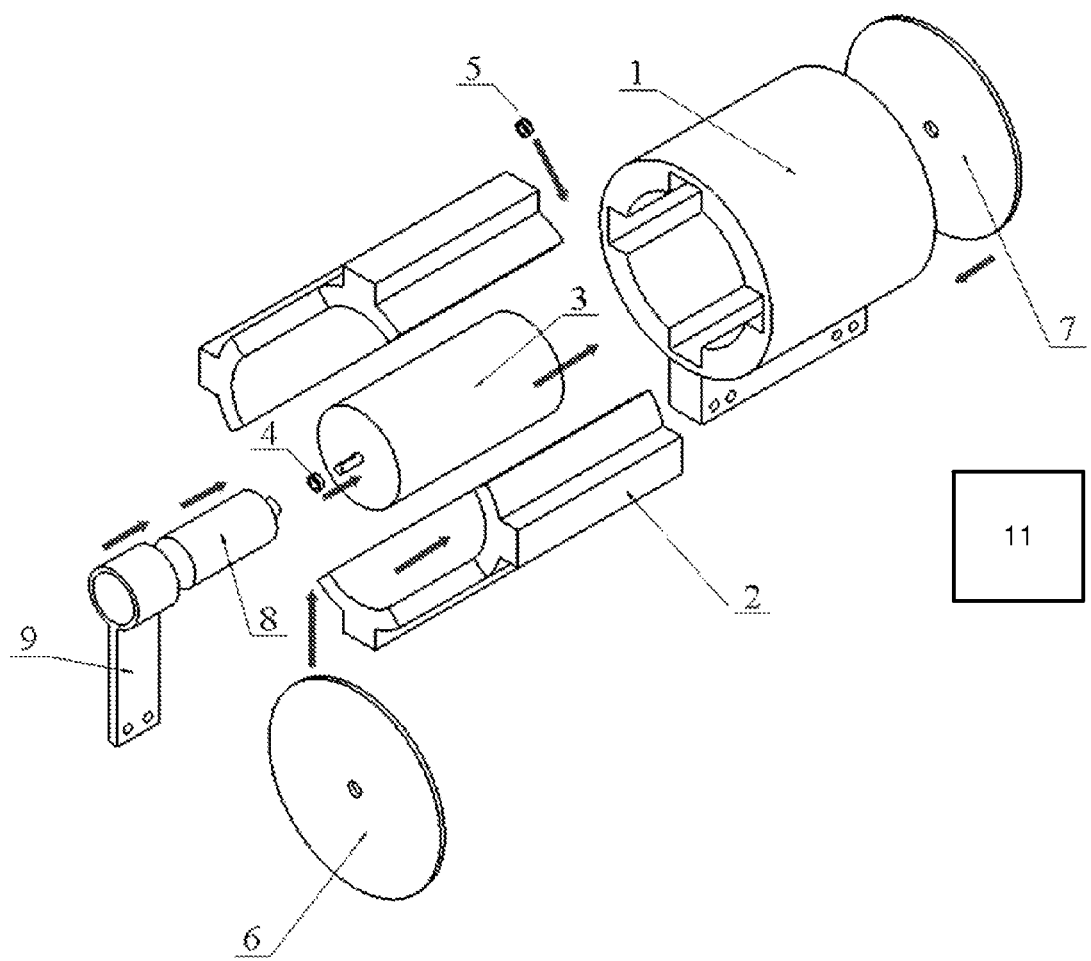
FIG. 1 is an explosion structure diagram of a first embodiment of a torque generation device based on electromagnetic effect.

Components shown in the figures include: a shell 1, a magnet set 2, an armature winding 3, a front bearing 4, a rear bearing 5, a front end cap 6, a rear end cap 7, a motor 8, a motor bracket 9, a motor seat 10 and a load 11.

DETAILED DESCRIPTION OF SAMPLE EMBODIMENTS

The present invention is further described with reference to the figures and specific example embodiments.

A torque generation device according to the present invention is based on electromagnetic effect, wherein an armature winding 3 is driven by a motor 8 to rotate in the magnetic field and cuts magnetic induction lines to generate induced electromotive force. When connected with a load such as a resistor, induced electromotive force can produce induction current in the armature winding 3, and then an electromagnetic torque <Tem>, whose direction is opposite to the motor driving direction, is applied on the armature winding 3. Meanwhile, a reverse electromagnetic torque <Tantiem>, which is reverse to the armature winding 3 with the same magnitude, is applied on a magnet set 2. Because a shell 1 is in fixed connection with the magnet set 2, the reverse electromagnetic torque <Tantiem> is transferred to the shell 1, and further transferred to an underactuated system, so as to provide the required torque to the underactuated system.

Figure 2:
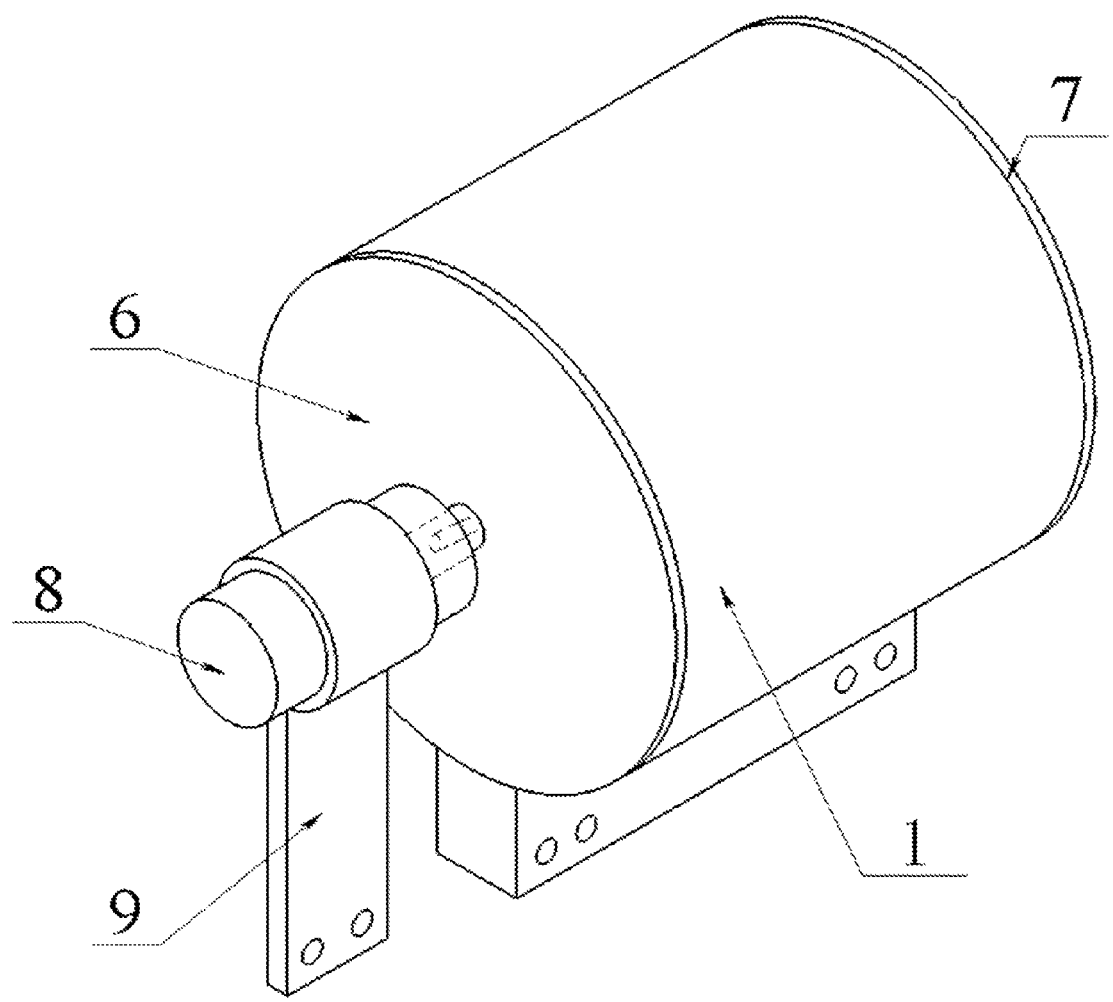
FIG. 2 is an isometric structure diagram of the first embodiment of a torque generation device based on electromagnetic effect.
Figure 3:
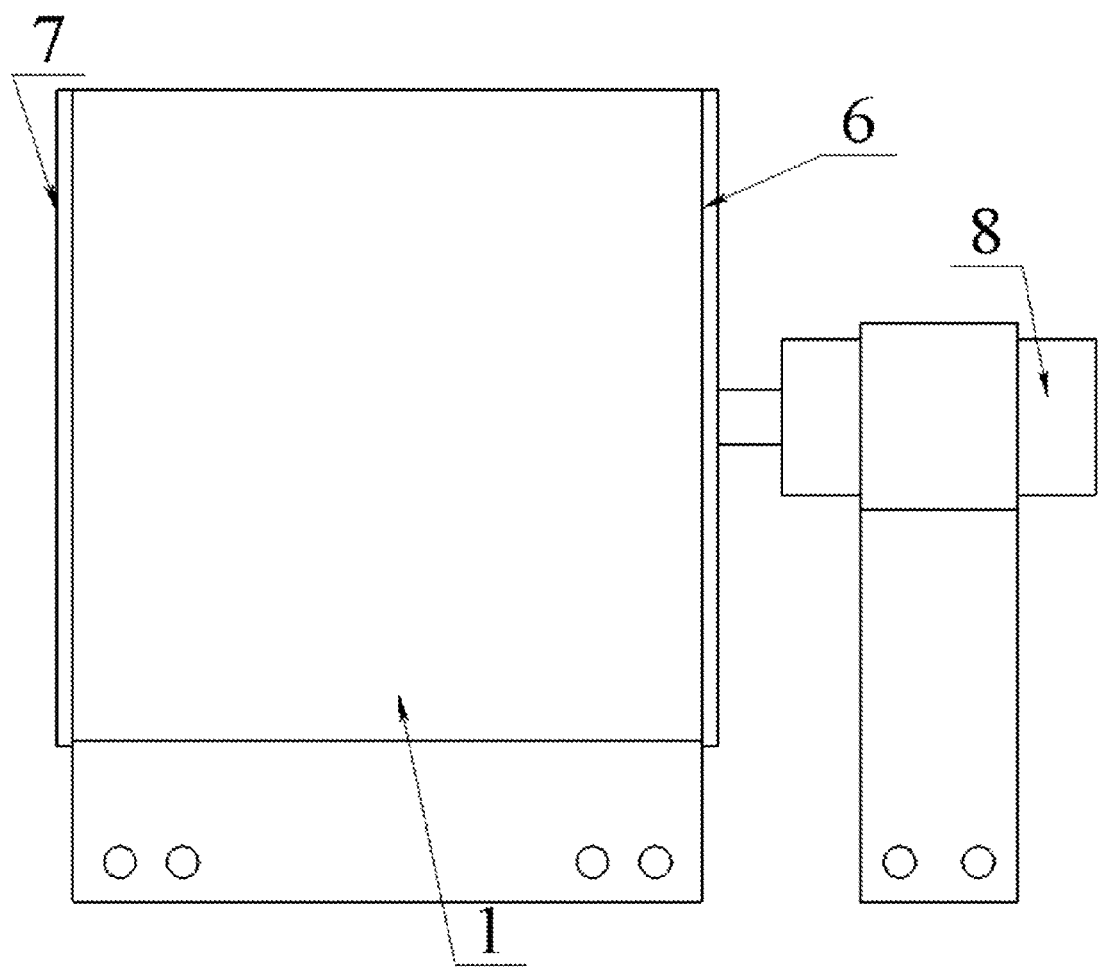
FIG. 3 is a side view of the first embodiment of a torque generation device based on electromagnetic effect.

A first embodiment of a torque generation device based on electromagnetic effect in accordance with the present invention is illustrated in FIGS. 1, 2 and 3. In one embodiment, the torque generation device includes: a shell 1, a magnet set 2, an armature winding 3, a front bearing 4, a rear bearing 5, a front end cap 6, a rear end cap 7, a motor 8, a motor bracket 9, and a load 11.

The shell 1 is a magnetic cylinder, the lower part thereof being connected with a rectangular parallelepiped that is fixedly connected with an underactuated system disposed outside the torque generation device. The underactuated system includes at least any one to-be-activated system among a unicycle robot, a helicopter, a saucer aircraft, a satellite, a spacecraft or a missile. The shell 1 further contains a magnet set 2, composed of a plurality of (e.g., four or more) blocks of permanent magnets which are symmetrically fixed and distributed on the inner side of the shell 1, and are in fixed connection so as to form an approximately constant magnetic field.

The armature winding 3 is coaxially inserted in the shell 1, and each of the armature winding 3 and the shell 1 rotates in the same direction relative to each other. Air gap exists between the magnet set 2 and the armature winding 3 that is in parallel connection with the load 11.

The front bearing 4, coaxially connected with the armature winding 3, is embedded in a bearing groove in the center of the front end cap 6 buckled on the front end part of the shell 1.

The rear bearing 5, coaxially connected with the armature winding 3, is embedded in a bearing groove in the center of the rear end cap 7, and the rear end cap 6 is buckled on the rear end part of the shell 1.

The motor 8 is in a coaxial rotary joint with the armature winding 3 by the arch key, with the armature winding 3 protruding from the front end cap 6.

The motor bracket 9 is formed by a ring located in the upper part of the motor bracket 9 and a rectangular strip located at the lower part of the motor bracket 9. The ring located in the upper part of the motor bracket 9 and the motor 8 are coaxially inserted and fixed. The rectangular strip located at the lower part of the motor bracket 9 is in fixed connection with a stationary part of the underactuated system.

Figure 4:
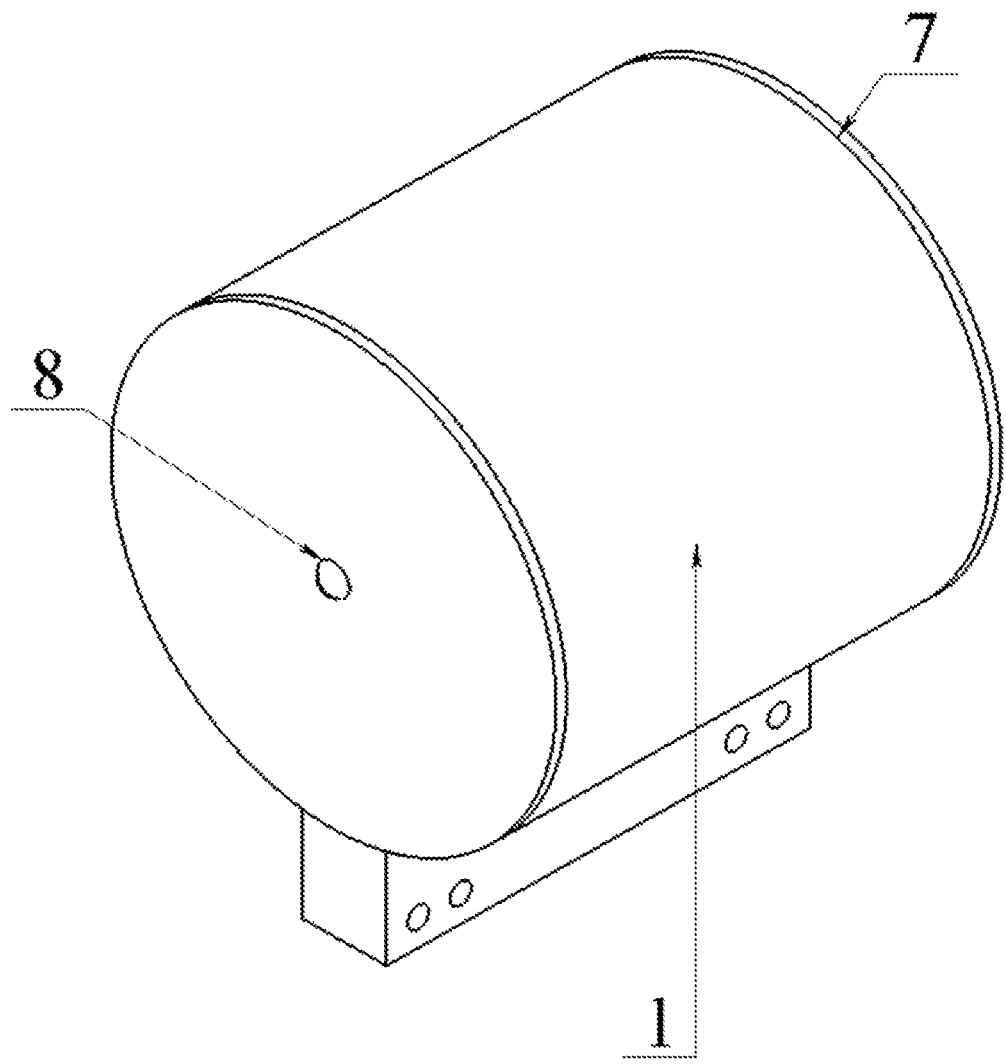
FIG. 4 is a diagram of a second embodiment of a torque generation device based on electromagnetic effect.

FIG. 4 illustrates a second embodiment of a torque generation device based on electromagnetic effect according to the method of torque generation based on electromagnetic effect. In one embodiment, the torque generation device includes: a shell 1, a magnet set 2, an armature winding 3, a rear bearing 5, a rear end cap 7, a motor 8, and a load 11.

The shell 1 is a magnetic cylinder, the lower part thereof being connected with a rectangular parallelepiped that is fixedly connected with an underactuated system disposed outside the torque generation device. The underactuated system includes at least any one to-be-activated system among a unicycle robot, a helicopter, a saucer aircraft, a satellite, a spacecraft or a missile. The shell 1 further contains a magnet set 2, composed of a plurality of (e.g., four or more) blocks of permanent magnets which are symmetrically fixed and distributed on the inner side of the shell 1, and are in fixed connection so as to form an approximately constant magnetic field.

The armature winding 3 is coaxially inserted in the shell 1, and each of the armature winding 3 and the shell 1 rotates in the same direction relative to each other. Air gap exists between the magnet set 2 and the armature winding 3 that is in parallel connection with the load 11.

The rear bearing 5, coaxially connected with the armature winding 3, is embedded in a bearing groove in the center of the rear end cap 7. The rear end cap 6 is buckled in the rear end part of the shell 1.

The motor 8 is embedded in the front part of the shell 1, and the shaft of the motor 8 is in a coaxial rotary joint with the armature winding 3 by the arch key.

Figure 5:
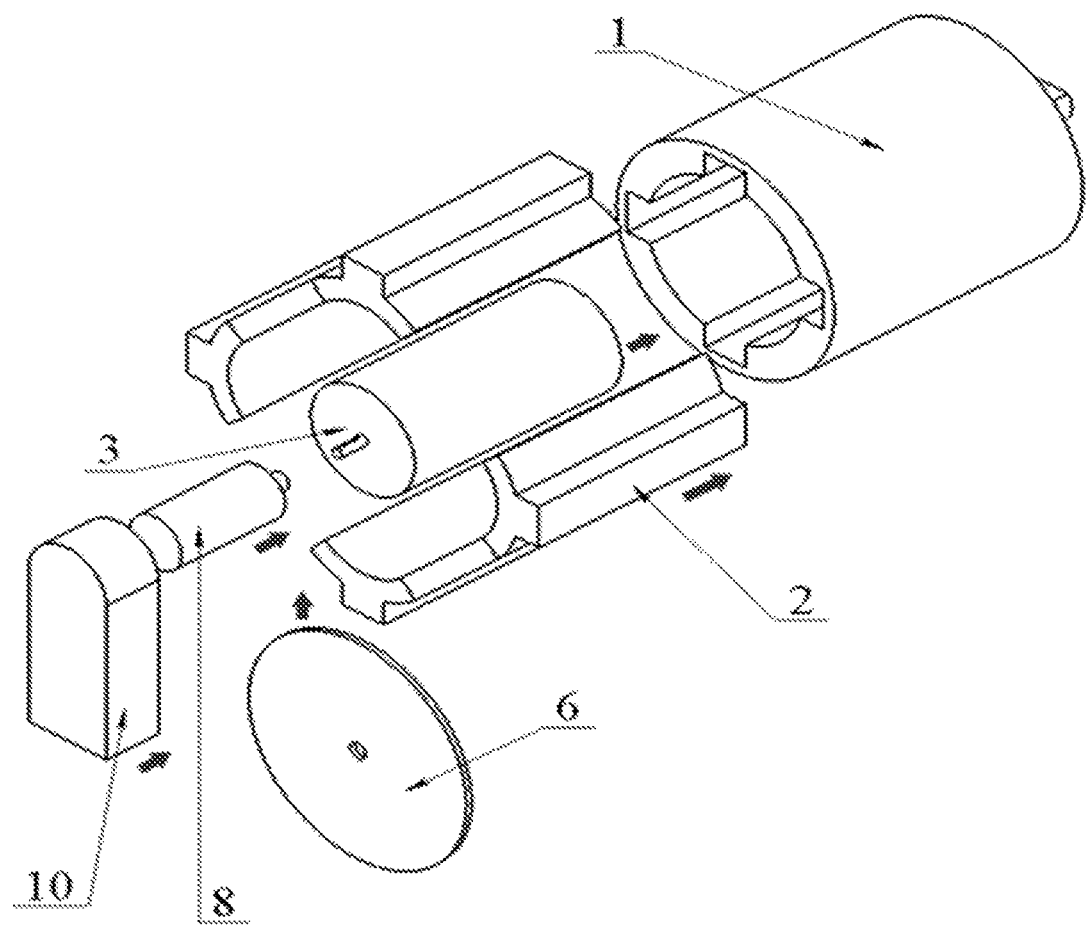
FIG. 5 is an explosion structure diagram of a third embodiment of a torque generation device based on electromagnetic effect.
Figure 6:
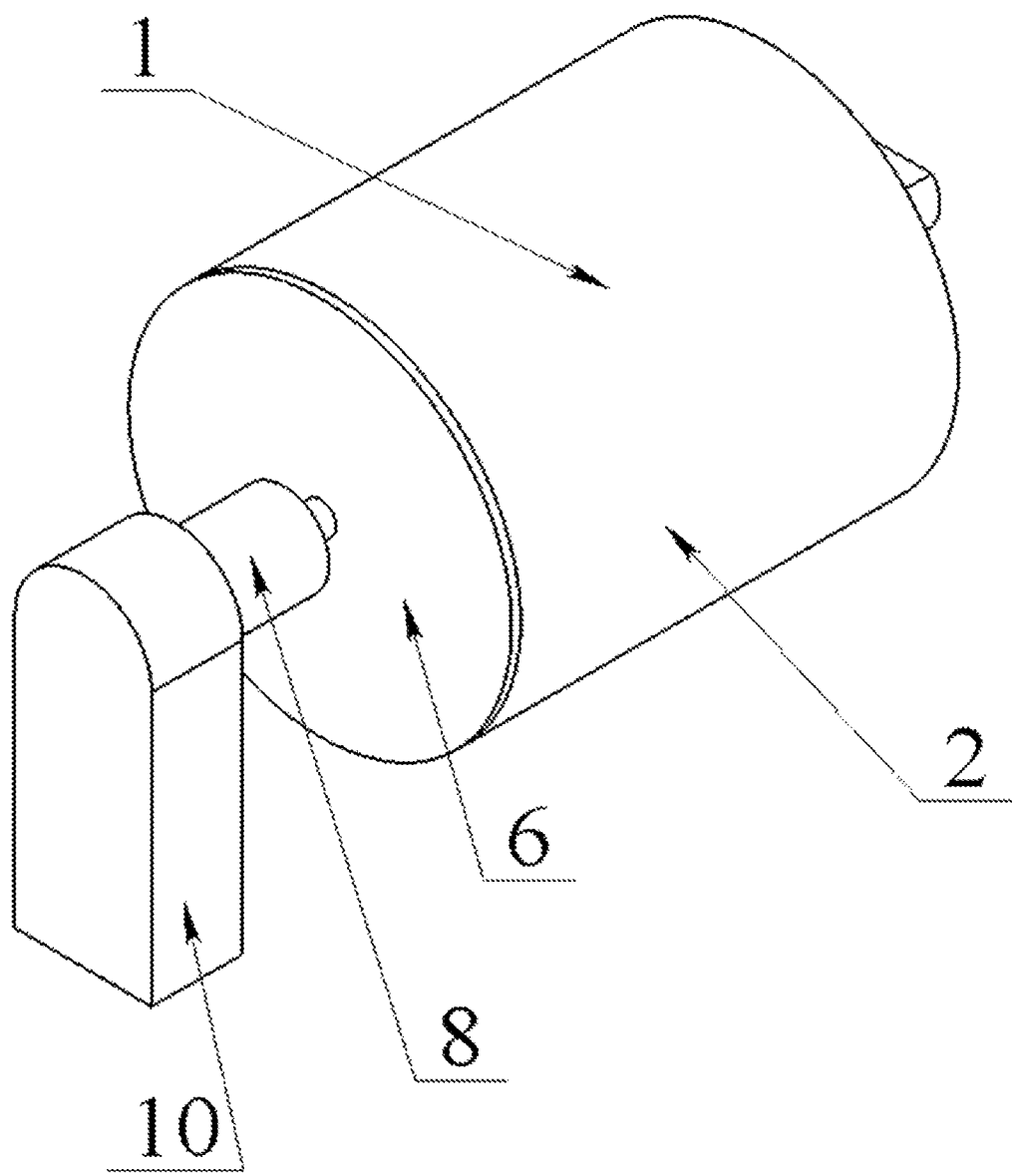
FIG. 6 is an isometric structure diagram of the third embodiment of a torque generation device based on electromagnetic effect.
Figure 7:
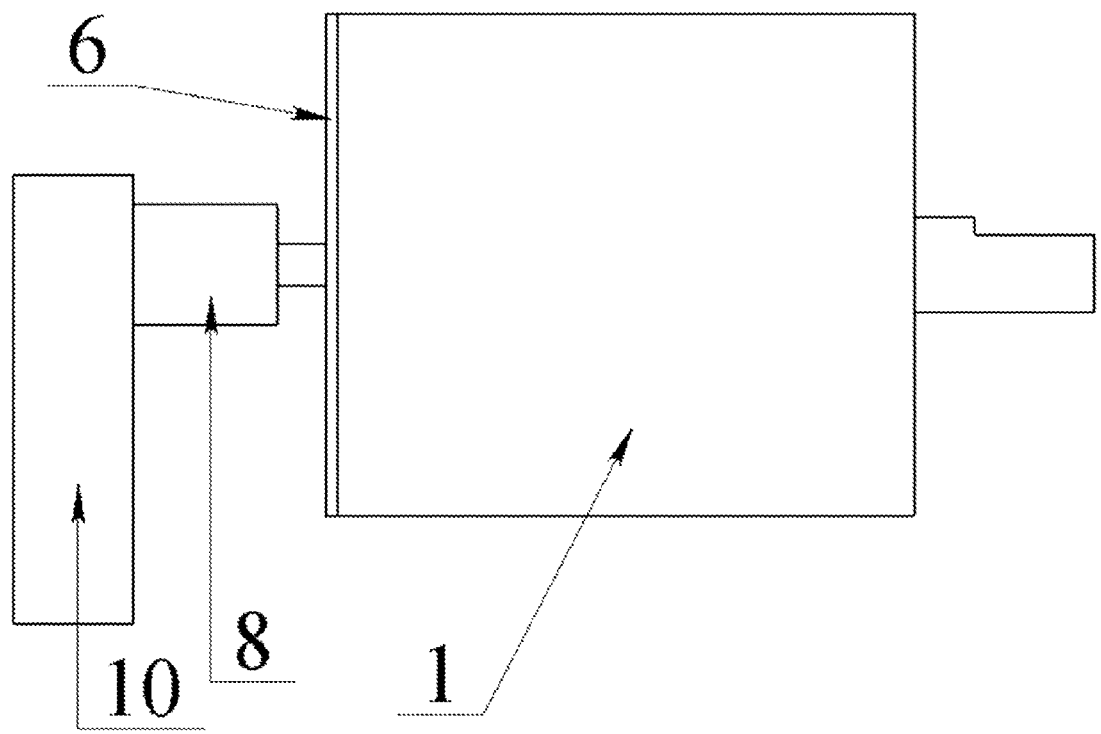
FIG. 7 is a side view of the third embodiment of a torque generation device based on electromagnetic effect.
Figure 8:
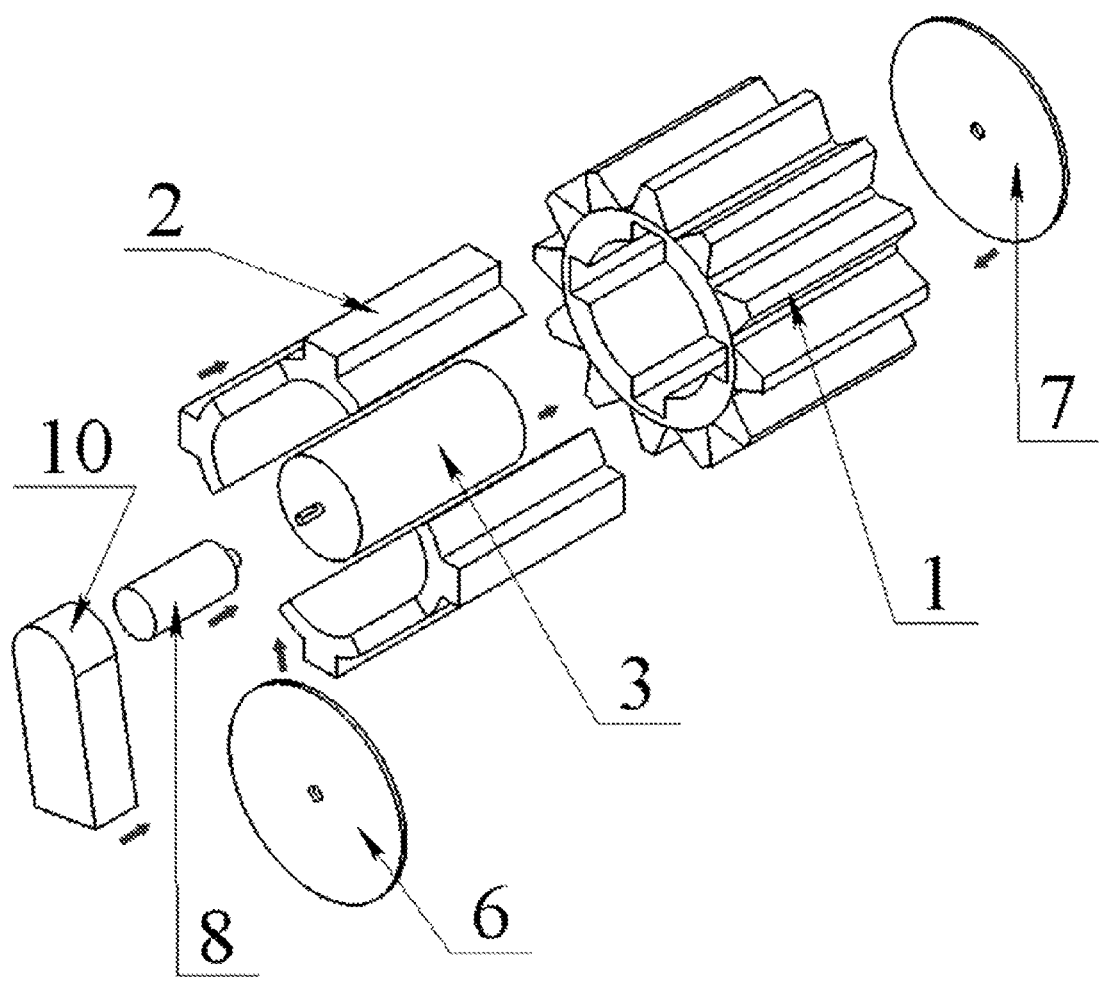
FIG. 8 is an explosion structure diagram of a fourth embodiment of a torque generation device based on electromagnetic effect.
Figure 9:
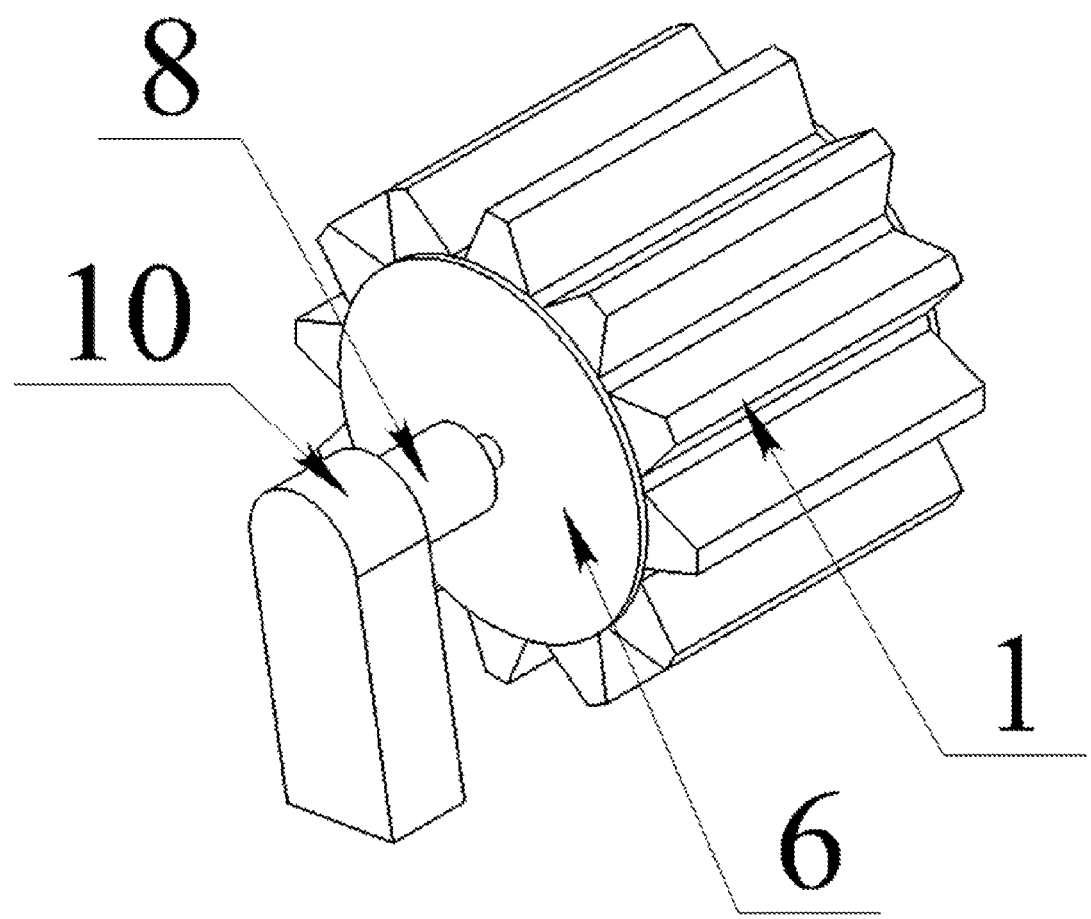
FIG. 9 is an isometric structure diagram of the fourth embodiment of a torque generation device based on electromagnetic effect.
Figure 10:
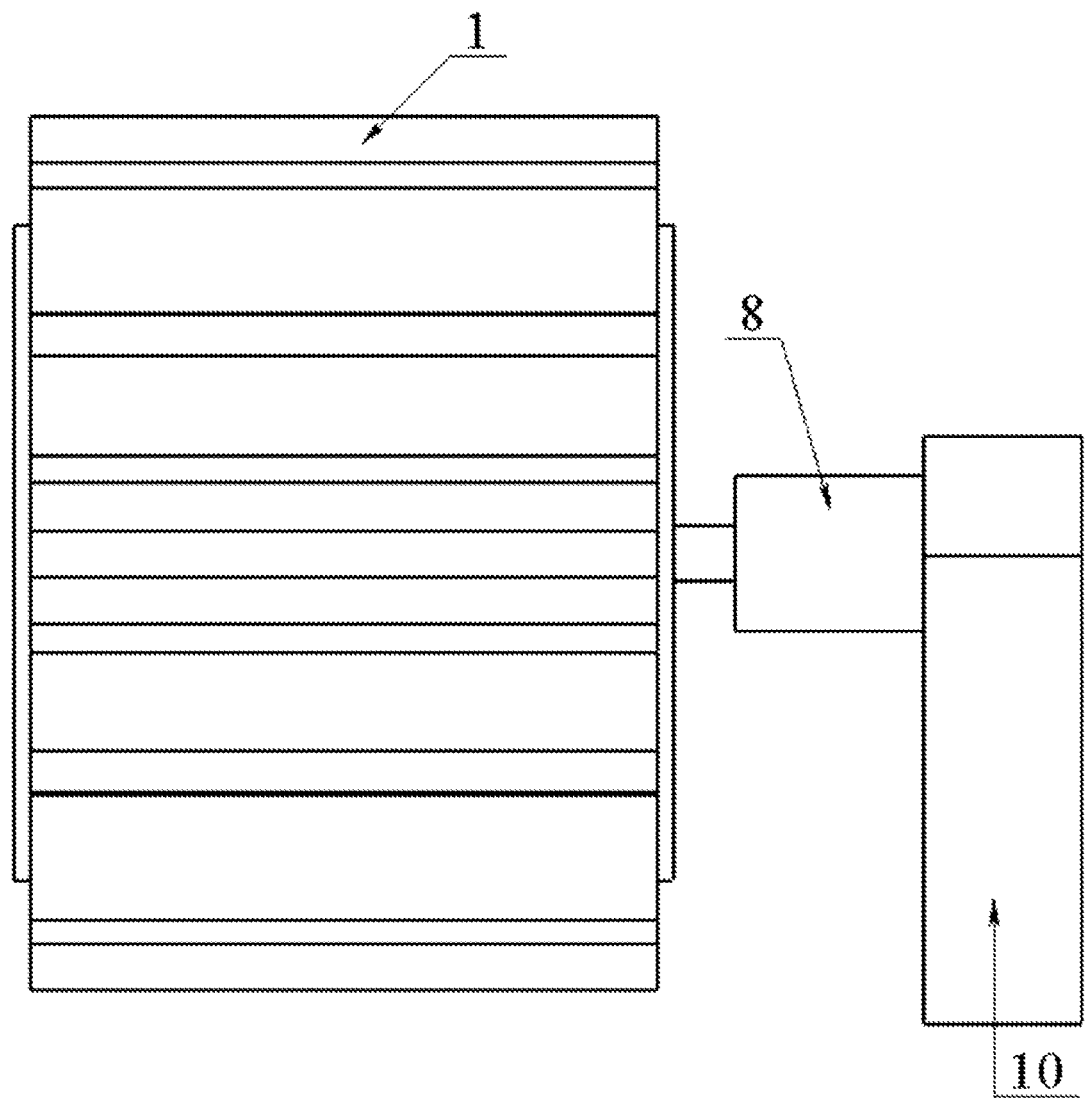
FIG. 10 is a side view of the fourth embodiment of a torque generation device based on electromagnetic effect.
Figure 11:
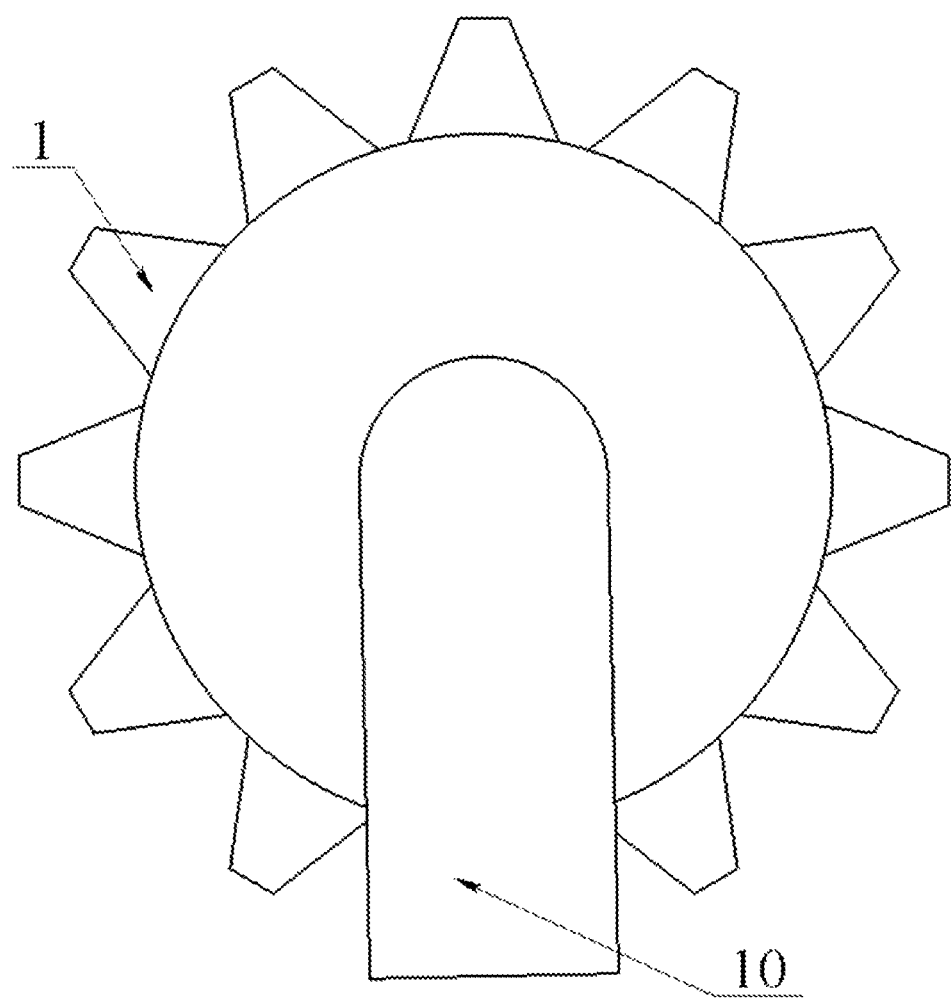
FIG. 11 is a front view of the fourth embodiment of a torque generation device based on electromagnetic effect.

FIGS. 5, 6 and 7 illustrate a third embodiment of a torque generation device based on electromagnetic effect according to the method of torque generation based on electromagnetic effect. In one embodiment, the torque generation device includes: a shell 1, a magnet set 2, an armature winding 3, a rear bearing 5, a front end cap 6, a motor 8, a motor seat 10, and a load 11.

The shell 1 is a magnetic cylinder formed through the integrated connection of a cylinder with one end open and a shaft of a variable cross-section at the external side of a bottom of the cylinder. The internal bottom of the cylinder is provided with a bearing groove. The shaft of the variable section is in a coaxial fixed joint with a certain underactuated system disposed outside the torque generator. The underactuated system includes at least any one to-be-activated system among a unicycle robot, a helicopter, a saucer aircraft, a satellite, a spacecraft or a missile. The shell 1 further contains a magnet set 2 that is composed of a plurality of (e.g., four or more) blocks. Permanent magnets of the magnet set 2 are symmetrically fixed and distributed on the inner side of the shell 1, and are in fixed connection so as to form an approximately constant magnetic field.

The armature winding 3 is coaxially inserted in the shell 1, and each of the armature winding 3 and the shell 1 rotates in the same direction relative to each other. Air gap exists between the magnet set 2 and the armature winding 3 that is in parallel connection with the load 11.

The center of the front end cap 6 is provided with a bearing groove so as to arrange a bearing which is in a coaxial rotary joint with the front end of the armature winding 3. The front end cap 6 is buckled in the front end part of the shell 1.

The motor 8 is fixed on a motor seat 10 that is in fixed connection with the underactuated system. The shaft of the motor 8 is in fixed connection with the armature winding 3 by the arch key, with the armature winding 3 protruding from the front end cap 6.

FIGS. 8, 9, 10 and 11 illustrate a fourth embodiment of a torque generation devices based on electromagnetic effect according to the method of torque generation based on electromagnetic effect. In one embodiment, the torque generation device includes: a shell 1, a magnet set 2, an armature winding 3, a front end cap 6, a rear end cap 7, a motor 8, a motor seat 10, and a load 11.

The shell 1 is a magnetic cylinder, the entire periphery of which is in integrated connection with an electromechanical transmission component (which may be any of a gear, a cam or an impeller, for example) is cooperatively connected with a certain underactuated system positioned outside the torque generator. The underactuated system comprises at least any one to-be-activated system among a unicycle robot, a helicopter, a saucer aircraft, a satellite, a spacecraft or a missile. The shell 1 further contains a magnet set 2, composed of a plurality of (e.g., four or more) blocks of permanent magnets which are symmetrically fixed and distributed on the inner side of the shell 1, and are in fixed connection so as to form an approximately constant magnetic field.

The armature winding 3 is coaxially inserted in the shell 1, and each of the armature winding 3 and the shell 1 rotates in the same direction relative to each other. Air gap exists between the magnet set 2 and the armature winding 3 that is in parallel connection with the load 11.

The center of the front end cap 6 is provided with a bearing groove so as to arrange a bearing which is in a coaxial rotary joint with the front end of the armature winding 3. The front end cap 6 is buckled in the front end part of the shell 1.

The center of the rear end cap 7 is provided with a bearing groove so as to arrange a bearing which is in a coaxial rotary joint with the rear end of the armature winding 3. The rear end cap 6 is buckled in the rear end part of the shell 1.

The motor 8 is fixed on a motor seat 10 that is in fixed connection with the underactuated system. The shaft of the motor 8 is in fixed connection with the armature winding 3 by the arch key, with the armature winding 3 protruding from the front end cap 6.

In one embodiment, a periphery of the shell 1 is coated with a layer of electromagnetic shielding material.

In one embodiment, permanent magnets of the magnet set 2 are replaced by an exciting winding which coaxially winds around a main pole core to form a magnetic field.

In one embodiment, the load 11 can be a power supply device to provide power for the motor 8, thereby saving energy.

In one embodiment, the shaft of the armature winding 3 is in a coaxial connection with the shaft of the motor 8 by the arch key. The number of arch key can be multiple, or the shaft that connects the armature winding 3 and the motor 8 is in square shape which can be engaged with the motor 8.

In one embodiment, the current direction of the armature winding 3 is in reverse direction under each pair of poles of the magnet set 2.

Figure 12:
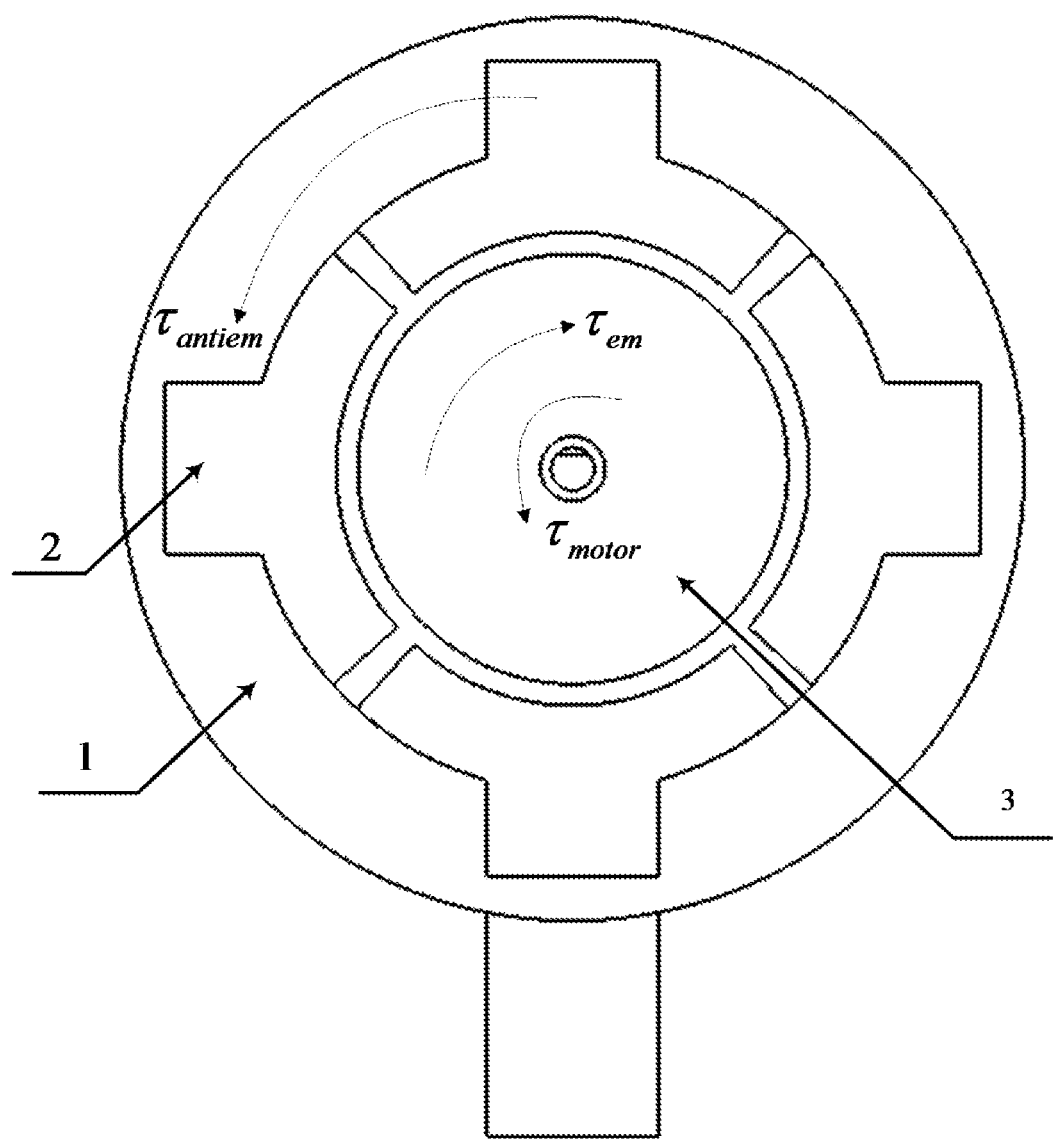
FIG. 12 is a force analysis diagram of a torque generation device based on electromagnetic effect according to the present invention.

Referring to FIG. 12, when an underactuated system needs to provide a counterclockwise torque, the speed of a motor is calculated based on the direct ratio between the magnitude of the torque and the rotating speed of the motor, namely, $\tau = k \cdot n$, in an inverse calculation manner. The motor is driven to rotate at the required speed in a counterclockwise manner with the armature winding cutting magnetic induction lines to form induced electromotive force Ea which is in direct ratio to the rotation speed n of the armature winding. Because the induced electromotive force Ea is connected with a constant load R, the induced electromotive force can generate induced current Ia in the armature winding. In the magnetic field, a clockwise electromagnetic torque <Tem> is applied on the armature winding, the magnitude of electromagnetic torque being in direct ratio to the induced current Ia. Due to interaction of forces, a counterclockwise reverse electromagnetic torque <Tantiem> of equal magnitude is applied on the magnet set. Based on the reverse electromagnetic torque <Tantiem>, the torque generation device provided in the present invention transfers the torque in a counterclockwise direction to the underactuated system. Similarly, when the underactuated system needs to provide a clockwise torque, the motor rotates in a clockwise manner and force analysis is stated as above. In this way, the underactuated system simply and conveniently can obtain the required torque and rotate around a fixed point or a fixed axis as expected, thereby completing the task of attitude adjustment.

The first embodiment pertains to the implementation of unicycle robot lateral balance control. The toque generation device provided in the present invention is loaded on a robot body. During the installation of the robot, a plane formed by the rotation of the armature winding is kept perpendicular to the forward movement direction of the unicycle robot; namely, the shaft of the armature winding is parallel to the roll axis of the unicycle robot system. When the robot performs normal walking, the entire body of the robot should keep a vertical state, or maintain the angle of the roll angle at zero degree. If lateral force is not applied, side over-falling will occur when the unicycle robot is subject to minor interference under the action of gravity. Even if the robot is activated, the heeling condition cannot automatically return to the balancing condition. An expected transverse roll angle of the unicycle robot is φE, a real-time transverse roll angle which is obtained through attitude sensors by the unicycle robot is φ, and all the angles adopt counterclockwise direction as positive direction similarly hereinafter. Based on calculation of the value of φE−φ, first, the controller inputs the value of φE−φ according to the preprogrammed linear or nonlinear proportional/integral/derivative (PID) algorithms or fuzzy value algorithm to work out a desired torque. Subsequently, the controller works out the rotating speed of the armature winding according to specific parameters of the device, and finally outputs control voltage U of the motor according to the specific parameters of the driving motor.

The second embodiment pertains to the implementation of unicycle robot veer control. The torque generation device provided in the present invention is loaded on a robot body. During the installation of the robot, a plane formed by the rotation of the armature winding is kept parallel to the forward movement direction of the unicycle robot; namely, the shaft of the armature winding is parallel to the yaw axis of the unicycle robot system. The scheme of yaw torque control is similar to that of unicycle robot lateral balance control, and thus detailed description of an implementation thereof is omitted hereby.

The third embodiment pertains to the implementation of attitude controls of a satellite, a spacecraft and a missile. The three torque generation devices provided in the present invention are capable of being orthogonally fixed on a satellite, a spacecraft or a missile. When the devices detect that the objects mentioned above require attitude adjustment, they work out the shafts around which they should rotate according to control algorithm, and then drive the motor in the direction of the shafts to rotate in turn so as to raise the required torque and complete the attitude adjustment. Under the conditions that the control is greatly time-sensitive and configuration of the devices is high enough, torques of the three shafts can be provided simultaneously, and attitude adjustment can be completed in one step.

The fourth embodiment pertains to the implementation of reverse torque overcoming of a helicopter and a saucer aircraft. The torque generation device provided in the present invention is loaded on the body of a helicopter or a saucer aircraft. During the installation of such a device, a plane formed by the rotation of the armature winding rotation is parallel to the rotation shaft of a main propeller of the helicopter or a saucer aircraft. When the main propeller of the helicopter or the saucer aircraft rotates in a counterclockwise direction, the body of the aircraft is subjected to a clockwise torque due to angular momentum conservation. In order to overcome this clockwise torque, the motor is driven to rotate in a counterclockwise direction to provide a counterclockwise reverse torque. Therefore, the two torques offset each other, thus spin phenomenon of the helicopter or the saucer aircraft can be avoided.

Those ordinarily skilled in the art would appreciate that the above forgoing embodiments are merely provided as an illustration of various aspects and potential implementations of the present invention and not to be construed as limitation thereof. As several embodiments of the present invention are described in detail, those of ordinary skill in the art would appreciate that any modification or equivalent substitution can be made to the present invention and, thus, any technical scheme or improvement within the spirit and scope of the invention are deemed to be covered by the claims below.

What is claimed is:

1. A torque generation device, comprising:
    an armature winding configured to receive an input torque;
    a shell comprising a magnetic cylinder and configured to deliver an output torque to an underactuated system disposed outside the torque generation device; and
    a magnet set comprising a plurality of blocks of permanent magnets and disposed on an inner side of the shell, wherein:
        the plurality of blocks of permanent magnets are symmetrically fixed and distributed on the inner side of the shell and are in fixed connection so as to form an approximately constant magnetic field,
        the armature winding is disposed coaxially in the shell with an air gap between the shell and the magnet set,
        the armature winding is driven by the input torque to rotate in the approximately constant magnetic field in response to the armature winding receiving the input torque, and
        the output torque is generated by an electromagnetic effect between the approximately constant magnetic field and the armature winding, the electromagnetic effect causing the shell to rotate and thereby deliver the output torque.

2. The torque generation device of claim 1, further comprising a motor configured to provide the input torque.

3. The torque generation device of claim 2, further comprising:
    a front bearing;
    a rear bearing;
    a front end cap;
    a rear end cap; and
    a motor bracket,
    wherein:
        a lower part of the shell is connected with a rectangular parallelepiped that is configured to be fixedly connected with the underactuated system,
        the front bearing is coaxially connected with the armature winding and is embedded in a bearing groove of the front end cap which is buckled in a front end part of the shell,
        the rear bearing is coaxially connected with the armature winding and is embedded in a bearing groove of the rear end cap which is buckled in a rear end part of the shell,
        the motor is in a coaxial rotary joint with a shaft of the armature winding with the armature winding protruding from the front end cap,
        the motor bracket is formed by a ring located in an upper part of the motor bracket and a rectangular strip located at a lower part of the motor bracket,
        the ring located in the upper part of the motor bracket and the motor are coaxially inserted and fixed, and
        the rectangular strip located at the lower part of the motor bracket is in a fixed joint with the underactuated system.

4. The torque generation device of claim 2, further comprising:
    a rear bearing; and
    a rear end cap,
    wherein:
        a lower part of the shell is connected with a rectangular parallelepiped that is fixedly connected with the underactuated system,
        the rear bearing is coaxially connected with the armature winding and is embedded in a bearing groove of the rear end cap which is buckled on a rear end part of the shell,
        the motor is embedded in a front end part of the shell, and
        a shaft of the motor is in a coaxial rotary joint with the armature winding.

5. The torque generation device of claim 2, further comprising:
    a front end cap; and
    a motor seat,
    wherein:
        the shell is formed through an integrated connection of a cylinder with one end open and a shaft of a variable cross-section at an external side of a bottom of the cylinder,
        an internal bottom of the cylinder of the shell includes a bearing groove,
        the shaft of the variable cross-section is in a coaxial fixed joint with the underactuated system,
        the front end cap includes a bearing groove configured to receive a bearing which is in a rotary joint with a front end of the armature winding,
        the front end cap is buckled in a front end part of the shell,
        the motor is fixed on the motor seat that is in fixed connection with the underactuated system,
        a shaft of the motor is in fixed connection with the armature winding, and
        the armature winding protrudes from the front end cap.

6. The torque generation device of claim 2, further comprising:
    a front end cap;
    a rear end cap; and
    a motor seat,
    wherein:
        a periphery of the magnetic cylinder of the shell is in integrated connection with an electromechanical transmission component and is cooperatively connected with the underactuated system,
        the front end cap includes a bearing groove to receive a front bearing which is in a coaxial rotary joint with a front end of the armature winding,
        the front end cap is buckled in a front end part of the shell,
        the rear end cap includes a bearing groove configured to receive a rear bearing which is in a coaxial rotary joint with a rear end of the armature winding in a rotating manner,
        the rear end cap is buckled in a rear end part of the shell,
        the motor is fixed on the motor seat that is in fixed connection with the underactuated system,
        a shaft of the motor is in fixed connection with the armature winding, and
        the armature winding protrudes from the front end cap.

7. The torque generation device of claim 2, wherein the armature winding is in parallel connection with a load, and wherein the load comprises a power supply device that provides power to the motor.

8. The torque generation device of claim 1, wherein the input torque and the output torque are in a same direction.

9. The torque generation device of claim 1, wherein a periphery of the shell is coated with a layer of an electromagnetic shielding material.

10. The torque generation device of claim 1, wherein at least one permanent magnet of the magnet set is replaced by an exciting winding which coaxially winds around a main pole core to form a magnetic field.

11. The torque generation device of claim 1, wherein the armature winding is in parallel connection with a load.

12. The torque generation device of claim 1, wherein the plurality of blocks of permanent magnets comprises four or more blocks of permanent magnets.

13. A method for applying a torque to an underactuated system, comprising:
   determining a magnitude of the torque to be applied to the underactuated system;
   calculating a rotational speed of a motor based on a ratio between the magnitude of the torque and the rotating speed of the motor;
   driving the motor at the rotational speed, the motor subsequently rotating an armature winding disposed coaxially in a cylindrical magnetic shell having an approximately constant magnetic field therein;
   generating the torque in a form of a rotation of the cylindrical magnetic shell by an electromagnetic effect between the approximately constant magnetic field and the armature winding; and
   applying the torque in the form of the rotation of the cylindrical magnetic shell to the underactuated system by a fixed connection between the cylindrical magnetic shell and the underactuated system.

14. The method of claim 13, wherein the determining of the magnitude of the torque to be applied to the underactuated system is based on a pre-programmed linear proportional-integral-derivative (PID) algorithm.

15. The method of claim 13, wherein the determining of the magnitude of the torque to be applied to the underactuated system is based on a pre-programmed nonlinear proportional-integral-derivative (PID) algorithm.

16. The method of claim 13, wherein the determining of the magnitude of the torque to be applied to the underactuated system is based on a fuzzy value algorithm.

\* \* \* \* \*